No. 635,141. Patented Oct. 17, 1899.
A. H. MARKS.
PROCESS OF RECLAIMING RUBBER FROM VULCANIZED RUBBER WASTE.
(Application filed Feb. 27, 1899.)
(Specimens.)
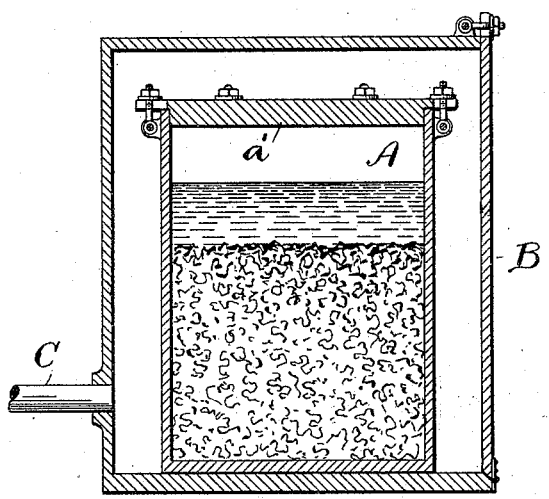
WITNESSES
E. B. Gilchrist
F. Griswold
INVENTOR
Arthur H. Marks
By Thurston & Bates
his attorneys

UNITED STATES PATENT OFFICE.

ARTHUR H. MARKS, OF AKRON, OHIO.

PROCESS OF RECLAIMING RUBBER FROM VULCANIZED-RUBBER WASTE.

SPECIFICATION forming part of Letters Patent No. 635,141, dated October 17, 1899.

Application filed February 27, 1899. Serial No. 706,982. (Specimens.)

*To all whom it may concern:*

Be it known that I, ARTHUR H. MARKS, a citizen of the United States, residing at Akron, in the county of Summit and State of Ohio, have invented a certain new and useful Improvement in Processes of Reclaiming Rubber from Vulcanized-Rubber Waste, of which the following is a full, clear, and exact description, reference being had to the accompanying drawing.

The invention has for its object the devulcanization of the rubber in vulcanized-rubber waste and the reclaiming of such rubber in a condition capable of being used for the various purposes for which fresh rubber is used and of being revulcanized.

The invention consists in subjecting the ground rubber waste, when submerged in a dilute alkaline solution—as, for example, a three-per-cent. solution of caustic soda—to the action of great heat—say from 344° to 370° Fahrenheit, more or less—for twenty hours, more or less, under conditions which prevent the evaporation of any considerable quantity of the solution.

In the best method now known to me for carrying out the process the finely-ground rubber waste is put into a suitable vessel, together with a dilute alkaline solution, a three-per-cent. solution of caustic soda being preferred, there being enough of the solution to permeate the rubber and completely submerge it. This vessel is then sealed up to prevent any considerable evaporation of the solution during the progress of the process, and the contents of the vessel are then heated to 344° to 370° Fahrenheit, more or less, and this temperature is maintained for twenty hours, more or less. The smaller the percentage of sulfur which the rubber contains the less the heat required and the shorter time it is necessary to maintain the heat; but as a practical process to be used day in and day out with vulcanized-rubber waste of various sorts as it is for sale in the open market a temperature of 344° to 370° Fahrenheit maintained for twenty hours has been found to produce the result sought—viz., the devulcanization of the rubber and incidentally the elimination of the fabric which the waste contained. The product of the process is then thoroughly washed to remove the chemicals, and there remains devulcanized rubber having substantially the characteristics of fresh rubber and capable of being used in like manner and for like purposes.

The drawing is a sectional view of an apparatus capable of use in carrying out the process.

A represents the vessel into which the ground waste and the chemical solution are placed, a' being the cover thereof, by which the vessel may be sealed.

B represents an outer receptacle capable of containing the vessel A and of being tightly closed. Steam is let into the outer vessel through a pipe C at a pressure of one hundred and twenty-five pounds, more or less, (equivalent to a temperature of 344° Fahrenheit,) and is kept at this pressure for the entire time necessary—say twenty hours. If the steam-pressure is increased, the time necessary for the production of the result sought will be reduced.

I have had heretofore no facilities for conducting the process at a greater temperature than is produced by one hundred and seventy-five pounds steam-pressure—namely, 370° Fahrenheit—at which temperature, however, equally good results are obtained in a somewhat shorter time. The results of such experiments as I have been able to make with temperature above that of steam of one hundred and seventy-five pounds pressure seem to indicate that the saving of time which results is not worth the additional cost and that the most economical method of practicing the process consists, as before stated, in heating the mixture in a tightly-closed vessel by means of steam at a pressure of one hundred and twenty-five pounds for about twenty hours.

Having described my invention, I claim—

The described process for devulcanizing rubber waste which consists in submerging the finely-ground rubber waste in a dilute alkaline solution in a sealed vessel, in heating the contents of the vessel to a temperature of 344° Fahrenheit more or less substantially as specified, and in maintaining said temperature for twenty hours more or less substantially as specified.

In testimony whereof I hereunto affix my signature in the presence of two witnesses.

ARTHUR H. MARKS.

Witnesses:
E. L. THURSTON,
PHILIP E. KNOWLTON.